(12) United States Patent
Tsuzaki et al.

(10) Patent No.: US 6,806,999 B2
(45) Date of Patent: Oct. 19, 2004

(54) RAMAN AMPLIFICATION PUMPING MODULE, RAMAN AMPLIFIER, AND OPTICAL COMMUNICATION SYSTEM

(75) Inventors: Tetsufumi Tsuzaki, Yokohama (JP); Motoki Kakui, Yokohama (JP); Masayuki Nishimura, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 365 days.

(21) Appl. No.: 10/127,449

(22) Filed: Apr. 23, 2002

(65) Prior Publication Data

US 2003/0123138 A1 Jul. 3, 2003

Related U.S. Application Data

(60) Provisional application No. 60/336,178, filed on Dec. 6, 2001.

(51) Int. Cl.$^7$ .................................................. H01S 3/00
(52) U.S. Cl. ........................................................ 359/334
(58) Field of Search ............................ 359/334, 341.31, 359/341.32

(56) References Cited

U.S. PATENT DOCUMENTS

| | | | |
|---|---|---|---|
| 3,515,897 A | 6/1970 | Culver | ................ 359/334 |
| 4,805,977 A | 2/1989 | Tamura et al. | ........... 350/96.16 |
| 5,532,868 A | 7/1996 | Gnauck et al. | ............. 359/332 |
| 5,887,093 A | 3/1999 | Hansen et al. | ................ 385/27 |
| 6,212,310 B1 | 4/2001 | Waarts et al. | ................ 385/24 |
| 6,292,288 B1 | 9/2001 | Akasaka et al. | ............. 359/334 |
| 6,414,786 B1 | 7/2002 | Foursa | ........................ 359/334 |
| 6,417,959 B1 * | 7/2002 | Bolshtyansky et al. | ..... 359/334 |
| 6,433,921 B1 | 8/2002 | Wu et al. | .................... 359/334 |
| 6,456,426 B1 | 9/2002 | Bolshtyansky et al. | ..... 359/334 |
| 2002/0021487 A1 | 2/2002 | Akasaka et al. | ............ 359/334 |
| 2002/0075561 A1 | 6/2002 | Krummich | ................... 359/334 |
| 2002/0085267 A1 | 7/2002 | Akasaka et al. | ............ 359/334 |
| 2002/0131119 A1 | 9/2002 | Hamoir et al. | .............. 359/134 |
| 2003/0174387 A1 * | 9/2003 | Eggleton et al. | ............ 359/334 |

OTHER PUBLICATIONS

"100nm bandwidth flat gain Raman amplifiers pumped and gain–equalized by 12–wavelength–channel WDM High Power Laser Diodes," Y. Emori and S. Namiki, PD, pp. 19-1—19-3.

"Cost–Effective Depolarized Diode Pump Unit Designed for C–Band Flat–Gain Raman Amplifiers to Control EDFA Gain Profile," Y. Emori, S. Matsushita, and S. Namiki, FF4–1, pp. 106–108.

* cited by examiner

Primary Examiner—Nelson Moskowitz
Assistant Examiner—Deandra M. Hughes
(74) Attorney, Agent, or Firm—McDermott Will & Emery LLP (57) ABSTRACT

The present invention provides a Raman amplification pumping module and others with a structure for effectively suppressing degradation of quality of signal light even with a breakdown in either one of a plurality of light sources. The Raman amplification pumping module is provided with light sources for emitting respective lightwaves with center wavelengths different from each other, and each of the center wavelengths of the lightwaves from these light sources is adjusted so that a difference between two center wavelengths selected therefrom is less than 6 nm.

16 Claims, 6 Drawing Sheets

RAMAN AMPLIFICATION PUMPING MODULE, RAMAN AMPLIFIER, AND OPTICAL COMMUNICATION SYSTEM

CROSS-REFERENCE TO RELATED APPLICATION

This application claims priority to Provisional Application Ser. No. 60/336,178 filed Dec. 6, 2001, which is hereby incorporated by reference in its entirety.

BACKGROUND OF THE INVENTION

Field of the Invention

The present invention relates to a Raman amplification pumping module which supplies pumping light for Raman amplification of signal light, a Raman amplifier including the Raman amplification pumping module, and an optical communication system including the Raman amplifier.

Related Background Art

The Raman amplifier is an optical component which supplies Raman amplification pumping light into an optical fiber being an optical waveguide, thereby Raman-amplifying signal light propagating in the optical fiber. For example, the wavelength of the signal light is in the 1.55$\mu$m band and the wavelength of the pumping light is near 1.45 $\mu$m. For the Raman amplification of signal lightwaves of multiple wavelength channels, an important point is that the gain of Raman amplification is flat in a signal wavelength band including these signal channels. A conceivable means for flattening the gain is use of a gain equalizer having a loss spectrum of a shape similar to a spectrum shape of the Raman amplification gain. Another conceivable method is use of the Raman amplification pumping light with a plurality of peak wavelengths. The latter is rather preferable in that the signal light suffers no loss and the energy of the pumping light can be effectively used.

For example, the Raman amplifiers described in Document "Y. Emori, et al., "100 nm bandwidth flat gain Raman amplifiers pumped and gain-equalized by 12-wavelength-channel WDM high power laser diodes," OFC '99, PD19 (1999)" use as the Raman amplification pumping light, multiplexed lightwaves resulting from multiplexing of lightwaves of twelve wavelength channels different from each other, in order to flatten the gain of Raman amplification in the signal wavelength band with the bandwidth of 100 nm. The light of each signal channel is obtained by polarization multiplexing of lightwaves in mutually orthogonal polarization states emitted from two semiconductor laser sources. In this Document, wavelength spacings between the 12-channel lightwaves are 7.5 nm or 15 nm. The Raman amplifiers disclosed in Japanese Patent Application Laid-Open No. 2000-98433 use as the pumping light the multiplexed lightwaves obtained in such a way that, in view of efficiency and gain flattening in multiplexing of lightwaves of multiple channels, the intervals between center wavelengths of lightwaves emitted from respective light sources are set in the range of not less than 6 nm nor more than 35 nm and these lightwaves are multiplexed to yield the multiplexed lightwaves.

SUMMARY OF THE INVENTION

The inventors investigated the foregoing prior art and found the following problem as a result of the investigation.

Namely, the aforementioned prior art had the problem that with a breakdown in either one of the light sources, the flatness of the Raman amplification gain was impaired to degrade the transmission quality of the signal light and in the polarization multiplexing case the transmission quality of the signal light was degraded furthermore.

The present invention has been accomplished in order to solve the above problem and an object of the present invention is to provide a Raman amplification pumping module having a configuration for effectively suppressing the degradation of the quality of the signal light even with a breakdown in either one of light sources, a Raman amplifier including the Raman amplification pumping module, and an optical communication system including the Raman amplifier.

A Raman amplification pumping module according to the present invention is configured to supply pumping light for Raman amplification of signal light propagating in an optical waveguide, into the optical waveguide. The Raman amplification pumping module comprises a pumping light generating system including a plurality of light sources; and a multiplexer for multiplexing a plurality of lightwaves outputted from the pumping light generating system. The plurality of light sources in the pumping light generating system emit lightwaves with their respective center wavelengths different from each other (differences between which are greater than 0 nm).

Particularly, in the case where, in the Raman amplification pumping module according to the present invention, lightwaves emitted from the plurality of light sources are subjected to polarization multiplexing, a difference between two center wavelengths selected out of the center wavelengths of those lightwaves is less than 6 nm. In the case where the lightwaves emitted from the plurality of light sources are not subjected to polarization multiplexing, a difference between two center wavelengths selected out of the center wavelengths of the lightwaves is practically 1 nm or more, preferably 2 nm or more.

Specifically, where one or more light source pairs are composed of light sources with center wavelengths of output lightwaves adjacent to each other, selected out of the plurality of light sources, wavelength spacings between the center wavelengths of the respective lightwaves emitted from the light sources included in these light source pairs are set less than 6 nm in the case where the lightwaves emitted from the plurality of light sources are subjected to polarization multiplexing. On the other hand, in the case where the lightwaves emitted from the plurality of light sources are not subjected to polarization multiplexing, a wavelength spacing between center wavelengths of lightwaves emitted from respective light sources included in one light source pair is practically set 1 nm or more, preferably 2 nm or more. Conversely, when attention is focused on the relation between the light source pairs, as to mutually different light source pairs including light sources which emit lightwaves with center wavelengths adjacent to each other, a wavelength spacing may be not less than 6 nm between a center wavelength of a lightwave emitted from one light source and a center wavelength of a lightwave emitted from another light source.

A Raman amplifier according to the present invention comprises an optical waveguide in which signal light propagates and which Raman-amplifies the signal light with supply of pumping light; and a Raman amplification pumping module of structure as described above, for supplying the pumping light into the optical waveguide (which is the Raman amplification pumping module according to the present invention). Further, an optical communication system according to the present invention comprises a Raman amplifier of structure as described above, for Raman-amplifying the signal light (which is the Raman amplifier according to the present invention).

In any of these Raman amplification pumping module, Raman amplifier, and optical communication system, the multiplexer multiplexes lightwaves with center wavelengths different from each other, which are emitted from the plurality of light sources incorporated in the pumping light generating system, to yield the pumping light and the pumping light is supplied into the optical waveguide such as an optical fiber or the like. The signal light propagating in the optical waveguide is then Raman-amplified in the optical waveguide. Particularly, in the present invention, the difference between center wavelengths of lightwaves emitted from a pair of light sources (with the center wavelengths of their output lightwaves adjacent to each other) out of the lightwaves emitted from the plurality of light sources is set less than 6 nm. If one should suffer a breakdown out of the two light sources with the difference below 6 nm between the center wavelengths as in this configuration, the output power of the other light source would be increased, whereby it is feasible to control the variation of the Raman amplification gain of the signal light at a low level in the Raman amplification optical fiber and, furthermore, to effectively suppress the degradation of the quality of the signal light in the optical communication system.

Specifically, where the lightwaves emitted from the plurality of light sources are subjected to polarization multiplexing in the Raman amplification pumping module according to the present invention, the pumping light generating system outputs 2N (N is an integer not less than 1) lightwaves with their respective center wavelengths different from each other and a difference is controlled below 6 nm between center wavelengths of the (2n−1)th and the (2n)th (n is an arbitrary integer not less than 1 nor more than N) lightwaves out of the 2N lightwaves. In this case, if either one of the 2N light sources should suffer a breakdown, the output power of another light source having the center wavelength difference of output light below 6 nm from that of the broken light source would be increased, whereby the variation of the Raman amplification gain of the signal light can be controlled at a low level in the Raman amplifier. This effectively suppresses the degradation of the quality of the signal light in the optical communication system. The center wavelength spacing between a pair of light sources is practically 1 nm or more, preferably 2 nm or more in the case where the lightwaves emitted from the respective light sources are not subjected to polarization multiplexing.

In the Raman amplification pumping module according to the present invention, the pumping light generating system may comprise a configuration for effecting polarization multiplexing of lightwaves out of those emitted from the plurality of light sources and feeding the multiplexed lightwaves to the multiplexer. In this case, it is feasible to increase the power of the Raman amplification pumping light.

Further, the Raman amplification pumping module according to the present invention may comprise a depolarizer for depolarizing a polarization state of the pumping light outputted from the pumping light generating system. In the Raman amplification pumping module according to the present invention, the multiplexer may be configured to multiplex two lightwaves with the difference less than 6 nm between their respective center wavelengths in mutually orthogonal polarization states. In any of these cases, stable Raman amplification operation can be achieved.

DETAILED DESCRIPTION OF THE PREFERRED EMBODIMENTS

Each of embodiments of the Raman amplification pumping module, Raman amplifier, and optical communication system according to the present invention will be described below in detail with reference to FIGS. 1 to 9. The same reference symbols will denote the same elements throughout the description of the drawings and redundant description will be omitted.

Figure 1:
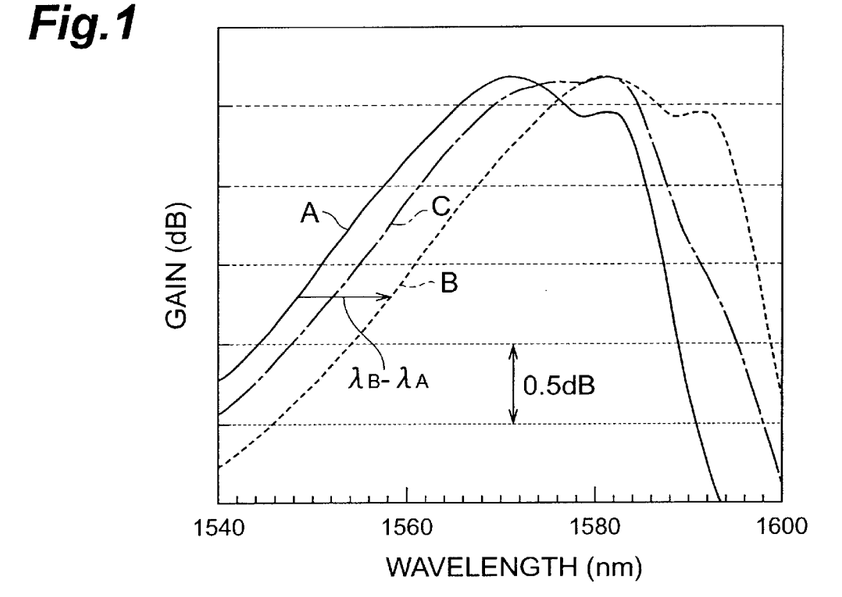
FIG. 1 is a graph showing Raman gain spectra in a dispersion-shifted optical fiber.

First, the following will describe the circumstances that led us to completing the present invention. FIG. 1 shows Raman gain spectra in a dispersion-shifted optical fiber. In FIG. 1, a Raman gain spectrum A is one yielded when the pumping light with the center wavelength $\lambda_A$ is supplied into the optical fiber. A Raman gain spectrum B is one yielded when the pumping light with the center wavelength $\lambda_B$ is supplied into the optical fiber. A further Raman gain spectrum C is one yielded when both the pumping light with the center wavelength $\lambda_A$ and the pumping light with the center wavelength $\lambda_B$ is supplied into the optical fiber. The Raman gain spectra A to C each are illustrated so that peak values thereof agree with each other. As can be seen from FIG. 1, the Raman gain spectrum yielded using as the Raman amplification pumping light the multiplexed light resulting from multiplexing of the two lightwaves with the different center wavelengths (wavelengths $\lambda_A$, $\lambda_B$) has a flat profile near the peak, as compared with the Raman gain spectra yielded using only either one lightwave as the Raman amplification pumping light.

Figure 2:
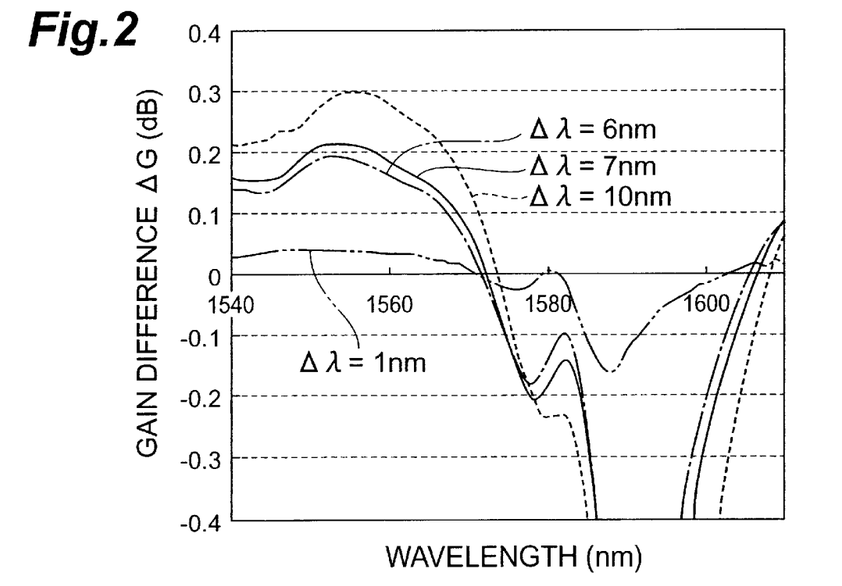
FIG. 2 is a graph showing differences between Raman gain spectra yielded using as the Raman amplification pumping light multiplexed light resulting from multiplexing of two lightwaves with different center wavelengths and Raman gain spectra yielded using as the Raman amplification pumping light only either one light.

FIG. 2 is a graph showing differences ΔG between Raman gain spectra yielded using as the Raman amplification pumping light the multiplexed light resulting from multiplexing of two lightwaves with different center wavelengths (wavelengths $\lambda_A$, $\lambda_B$) and Raman gain spectra yielded using only either one lightwave as the Raman amplification pumping light. FIG. 2 shows the difference spectra obtained when the difference $\Delta\lambda(=\lambda_B-\lambda_A)$ between the center wavelengths of the two lightwaves is either of 1 nm, 6 nm, 7 nm, and 10 nm. As can be seen from this FIG. 2, in the gain range where the difference is not more than 1 dB from the peak gain value in the Raman gain spectra yielded using only either one light as the Raman amplification pumping light, the absolute value of the gain difference ΔG is not more than 0.3 dB if the center wavelength difference AX is not more than 10 nm; the absolute value of the gain difference ΔG is not more than 0.2 dB if the center wavelength difference Δλ is less than 6 nm. Namely, under the circumstances where either one light source suffers a breakdown out of the two light sources with different center wavelengths of output light and there is no choice but to use the light emitted from only the other light source, as the Raman amplification pumping light, it is feasible to control the variation of gain at or below 0.2 dB and suppress the degradation of transmission quality of the signal light if the center wavelength difference $\Delta\lambda$ is less than 6 nm. The present invention has been accomplished on the basis of the Inventor's expertise as described above.

Figure 3:
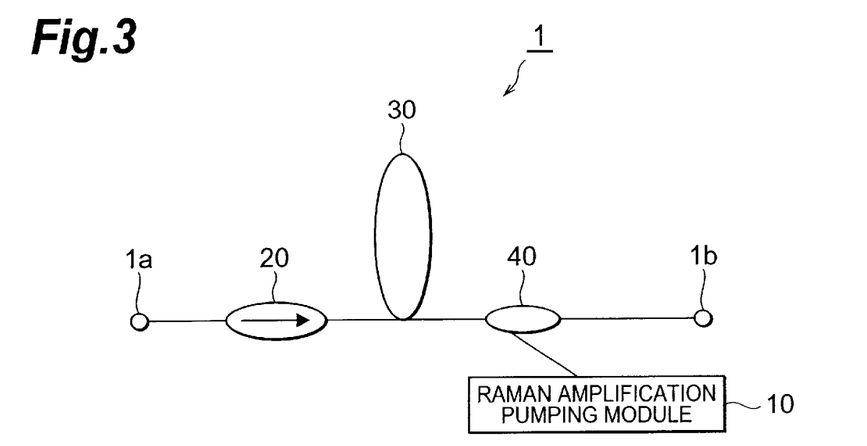
FIG. 3 is an illustration showing a configuration of a Raman amplifier according to the present invention.
Figure 4:
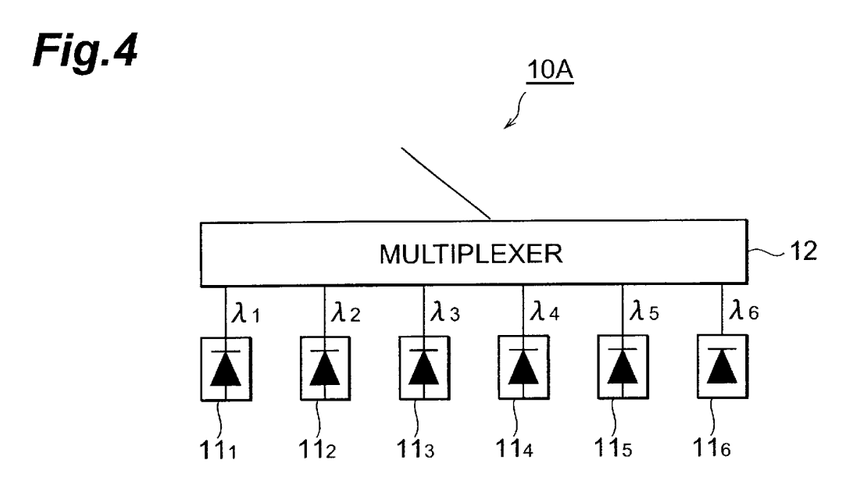
FIG. 4 is an illustration showing a configuration of a first embodiment of the Raman amplification pumping module according to the present invention.

Next, each of embodiments of the Raman amplification pumping module and the Raman amplifier according to the present invention will be described. FIG. 3 is an illustration showing a configuration of Raman amplifier 1 according to the present invention. FIG. 4 is an illustration showing a configuration of the first embodiment of the Raman amplification pumping module according to the present invention (an equivalent of the Raman amplification pumping module 10 shown in FIG. 3).

In the Raman amplifier 1 shown in FIG. 3, an optical isolator 20, a Raman amplification optical fiber 30, and a multiplexing module 40 are arranged in order from an input end 1a toward an output end 1b, and the Raman amplification pumping module 10 is coupled to the multiplexing module 40. The Raman amplification pumping module 10 can be substantiated in either of various embodiments as described hereinafter (cf. FIGS. 4 and 6 to 8).

The Raman amplification pumping module 10A of the first embodiment, shown in FIG. 4, consists of six light sources $11_1$ to $11_6$, a multiplexer 12, and a control unit 15.

The light sources $11_1$ to $11_6$ each are preferably semiconductor laser sources. The difference $(\lambda_{2n}-\lambda_{2n-1})$ between the center wavelength $\lambda_{2n-1}$ of the output light from the light source $11_{2n-1}$ and the center wavelength $\lambda_{2n}$ of the output light from the light source $11_{2n}$ is less than 6 nm (n=1, 2, or 3). The difference $(\lambda_{2n+1}-\lambda_{2n})$ between the center wavelength $\lambda_{2n}$ of the output light from the light source $11_{2n}$ and the center wavelength $\lambda_{2n+1}$ of the output light from the light source $11_{2n+1}$ may be not less than 6 nm (n=1 or 2). For example, the center wavelength $\lambda_1$ of the output light from the light source $11_1$ is 1430 nm, the center wavelength $\lambda_2$ of the output light from the light source $11_2$ 1433 nm, the center wavelength $\lambda_3$ of the output light from the light source $11_3$ 1450 nm, the center wavelength $\lambda_4$ of the output light from the light source $11_4$ 1453 nm, the center wavelength $\lambda_5$ of the output light from the light source $11_5$ 1465 nm, and the center wavelength $\lambda_6$ of the output light from the light source $11_6$ 1468 nm. When the lightwaves with the respective wavelengths ($\lambda_1$ to $\lambda_6$) are not subjected to polarization multiplexing in the multiplexer 12, the difference $(\lambda_{2n}-\lambda_{2n-1})$ between the center wavelength $\lambda_{2n-1}$ of the output light from the light source $11_{2n-1}$ and the center wavelength $\lambda_{2n}$ of the output light from the light source $11_{2n}$ is practically 1 nm or more, preferably 2 nm or more.

Figure 5:
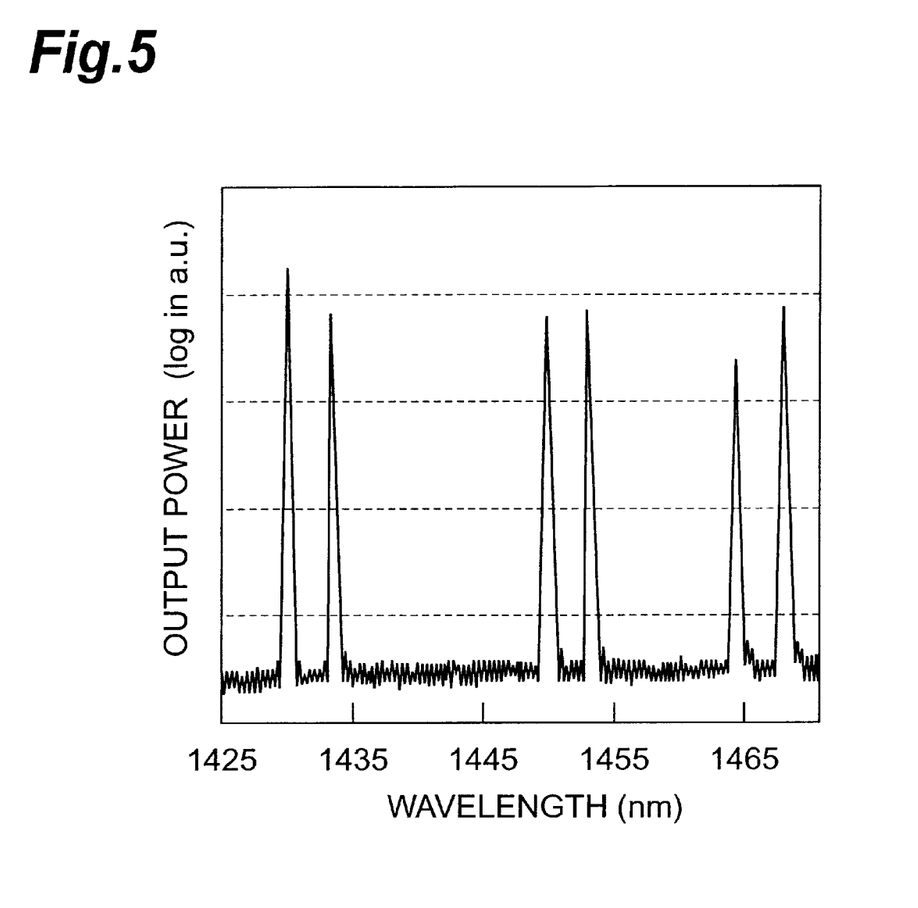
FIG. 5 is a graph showing spectra of the Raman amplification pumping light outputted from the Raman amplification pumping module in the first embodiment shown in FIG. 4.

The multiplexer 12 multiplexes the lightwaves with the center wavelengths $\lambda_1$ to $\lambda_6$ emitted from the light sources $11_1$ to $11_6$, and feeds the multiplexed lightwaves as the pumping light for Raman amplification to the multiplexing module 40. FIG. 5 shows spectra of the Raman amplification pumping light outputted from the Raman amplification pumping module 10A of the first embodiment shown in FIG. 4.

The optical isolator 20 allows light coming from the input end 1a to pass therethrough toward Raman amplification optical fiber 30, but does not allow light to pass in the opposite direction. The Raman amplification optical fiber 30 permits the signal light from the optical isolator 20 to propagate therein. The Raman amplification pumping light from the multiplexing module 40 is supplied into the Raman amplification optical fiber 30, whereupon the signal light is Raman-amplified. The multiplexing module 40 outputs the signal light from the Raman amplification optical fiber 30 (the Raman-amplified signal light) toward the output end 1b, and also outputs the Raman amplification pumping light from the Raman amplification pumping module 10 toward the Raman amplification optical fiber 30.

In this Raman amplifier 1 and the Raman amplification pumping module 10A of the first embodiment, the multiplexer 12 multiplexes the lightwaves with the center wavelengths $\lambda_1$ to $\lambda_6$ emitted from the respective light sources $11_1$ to $11_6$ to yield the pumping light. The Raman amplification pumping light (multiplexed lightwaves) outputted from this multiplexer 12 is supplied through the multiplexing module 40 into the Raman amplification optical fiber 30. The signal light of multiple wavelength channels in the 1.55 μm wavelength band fed via the input end 1a propagates through the optical isolator 20 and then in the Raman amplification optical fiber 30. The signal light is Raman-amplified during the propagation in the optical fiber. Then the Raman-amplified signal light of multiple channels propagates through the multiplexing module 40 and then is outputted from the output end 1b.

In the first embodiment, the difference $(\lambda_{2n}-\lambda_{2n-1})$ between the center wavelengths $\lambda_{2n-1}$, $\lambda_{2n}$ of the output lightwaves from the light sources $11_{2n-1}$, $\lambda 11_{2n}$ is less than 6 nm (n=1, 2, or 3). Accordingly, for example, in the event that the light source $11_1$ with the center wavelength $\lambda_1$ of the output light suffers a breakdown out of the six light sources $11_1$ to $11_6$, the variation of the Raman amplification gain of the signal light in the Raman amplification optical fiber 30 can be controlled at or below 0.2 dB by increasing the output power of the light source $11_2$ with the center wavelength $\lambda_2$ of the output light (the difference of which from $\lambda_1$ is not more than 6 nm) and, as a result, the degradation of the transmission quality of the signal light can be effectively suppressed.

Figure 6:
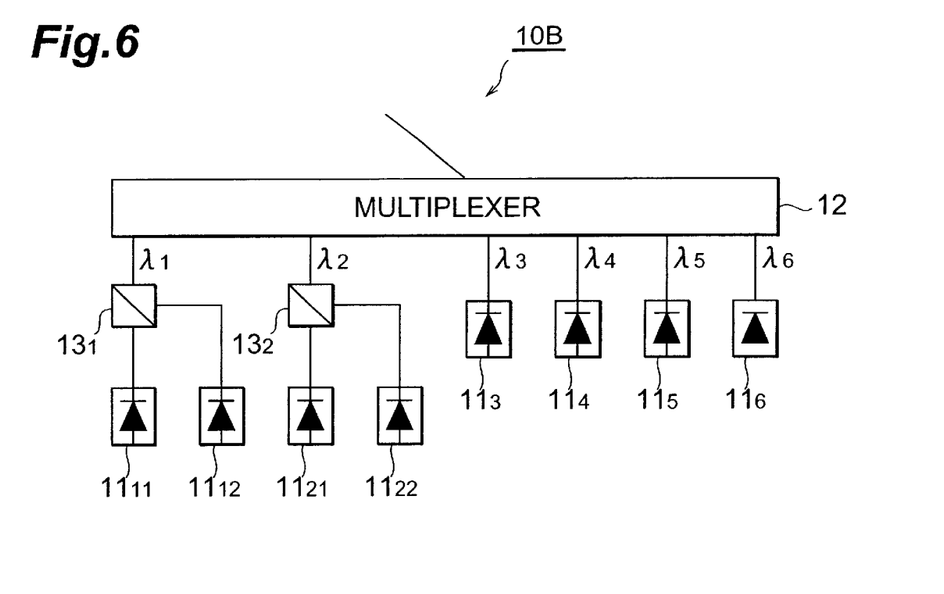
FIG. 6 is an illustration showing a configuration of a second embodiment of the Raman amplification pumping module according to the present invention.

FIG. 6 is an illustration showing a configuration of the second embodiment of the Raman amplification pumping module according to the present invention. This Raman amplification pumping module 10B of the second embodiment consists of eight light sources $11_{11}$, $11_{12}$, $11_{21}$, $11_{22}$, $11_3$ to $11_6$, polarization multiplexers $13_1$, $13_2$, and a multiplexer 12. The light sources $11_{11}$ and $11_{12}$ emit linearly polarized light components, which are lightwaves with an identical center wavelength $\lambda_1$ (e.g., 1430 nm). The polarization multiplexer $13_1$, multiplexes polarized lightwaves with the center wavelength $\lambda_1$ emitted from the light sources $11_{11}$, $11_{12}$ and outputs the multiplexed lightwaves to the multiplexer 12. The light sources $11_{21}$ and $11_{22}$ emit linearly polarized lightwaves, which are lightwaves with an identical center wavelength $\lambda_2$ (e.g., 1433 nm). The polarization multiplexer $13_2$ multiplexes the polarized lightwaves with the center wavelength $\lambda_2$ emitted from the light sources $11_{21}$, $11_{22}$ and outputs the multiplexed lightwaves to the multiplexer 12. The multiplexer 12 multiplexes the lightwaves with the center wavelengths $\lambda_1$, $\lambda_2$ outputted from the polarization multiplexers $13_1$, $13_2$ and the lightwaves with the center wavelengths $\lambda_3$ to $\lambda_6$ emitted from the light sources $11_3$ to $11_6$ and outputs the multiplexed lightwaves as the pumping light for Raman amplification. The polarization multiplexing as described can increase the power of the light with the center wavelengths $\lambda_1$, $\lambda_2$ included in the Raman amplification pumping light.

Figure 7:
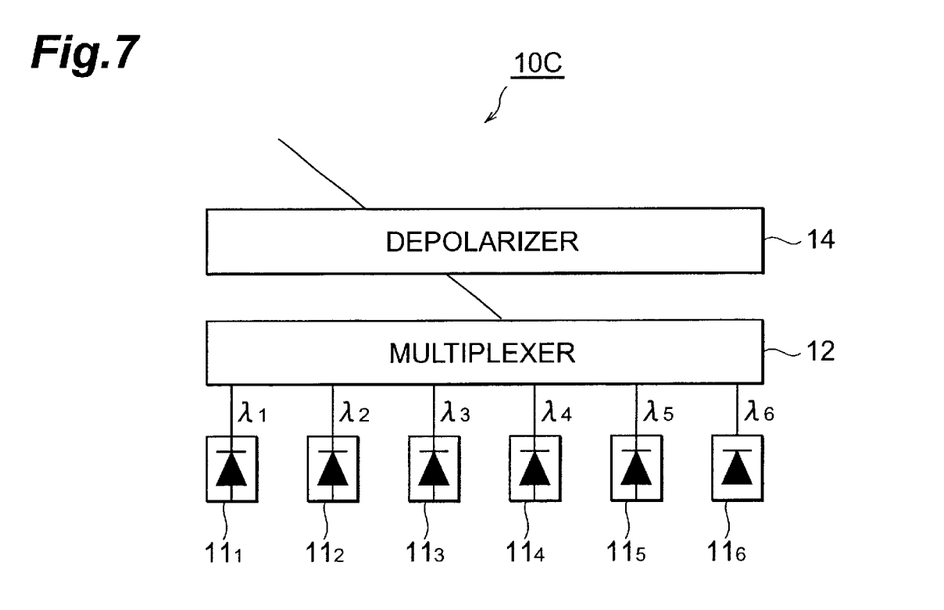
FIG. 7 is an illustration showing a configuration of a third embodiment of the Raman amplification pumping module according to the present invention.

FIG. 7 is an illustration showing a configuration of the third embodiment of the Raman amplification pumping module according to the present invention. The Raman amplification pumping module 10C of the third embodiment is further equipped with a depolarizer 14, in addition to the Raman amplification pumping module 10A of the first embodiment shown in FIG. 4. The depolarizer 14 depolarizes the Raman amplification pumping light outputted from the multiplexer 12 and supplies the Raman amplification pumping light thus depolarized, through the multiplexing module 40 into the Raman amplification optical fiber 30. The provision of the depolarizer 14 ensures stable Raman amplification operation. The depolarizer may be located between each light source 11 and the multiplexer 12. As arrangement of the depolarizer between the light sources and the multiplexer, one depolarizer may be provided per light source 11, or one depolarizer may be provided after multiplexing of lightwaves emitted from a plurality of light sources 11.

Figure 8:
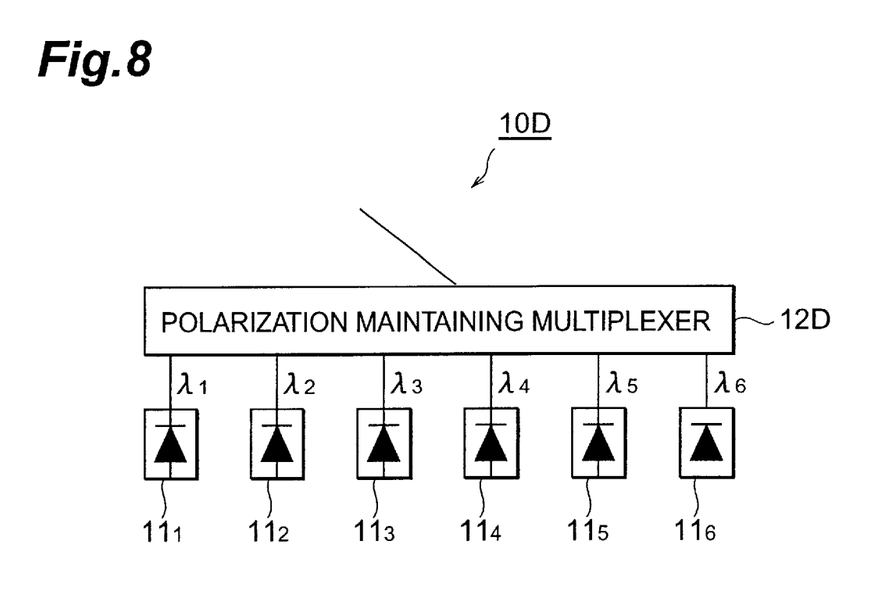
FIG. 8 is an illustration showing a configuration of a fourth embodiment of the Raman amplification pumping module according to the present invention.

FIG. 8 is an illustration showing a configuration of the fourth embodiment of the Raman amplification pumping module according to the present invention. The Raman amplification pumping module 10D of the fourth embodiment is of a configuration in which a polarization maintaining multiplexer 12D replaces the multiplexer 12 in the Raman amplification pumping module 10A of the first embodiment shown in FIG. 4. The semiconductor laser light sources as the light sources 11 emit linearly polarized lightwaves. The polarization maintaining multiplexer 12D multiplexes the lightwaves with the center wavelengths $\lambda 1$, $\lambda_2$ (the difference between which is less than 6 nm) emitted from the light sources $11_1$, $11_2$, to yield multiplexed lightwaves in mutually orthogonal polarization states, multiplexes the lightwaves with the center wavelengths $\lambda_3$, $\lambda_4$ (the difference between which is less than 6 nm) emitted from the light sources $11_3$, $11_4$, to yield multiplexed lightwaves in mutually orthogonal polarization states, and multiplexes the lightwaves with the center wavelengths $\lambda_5$, $\lambda_6$ (the difference between which is less than 6 nm) emitted from the light sources $11_5$, $11_6$, to yield multiplexed lightwaves in mutually orthogonal polarization states. This configuration ensures stable Raman amplification operation.

Figure 9:
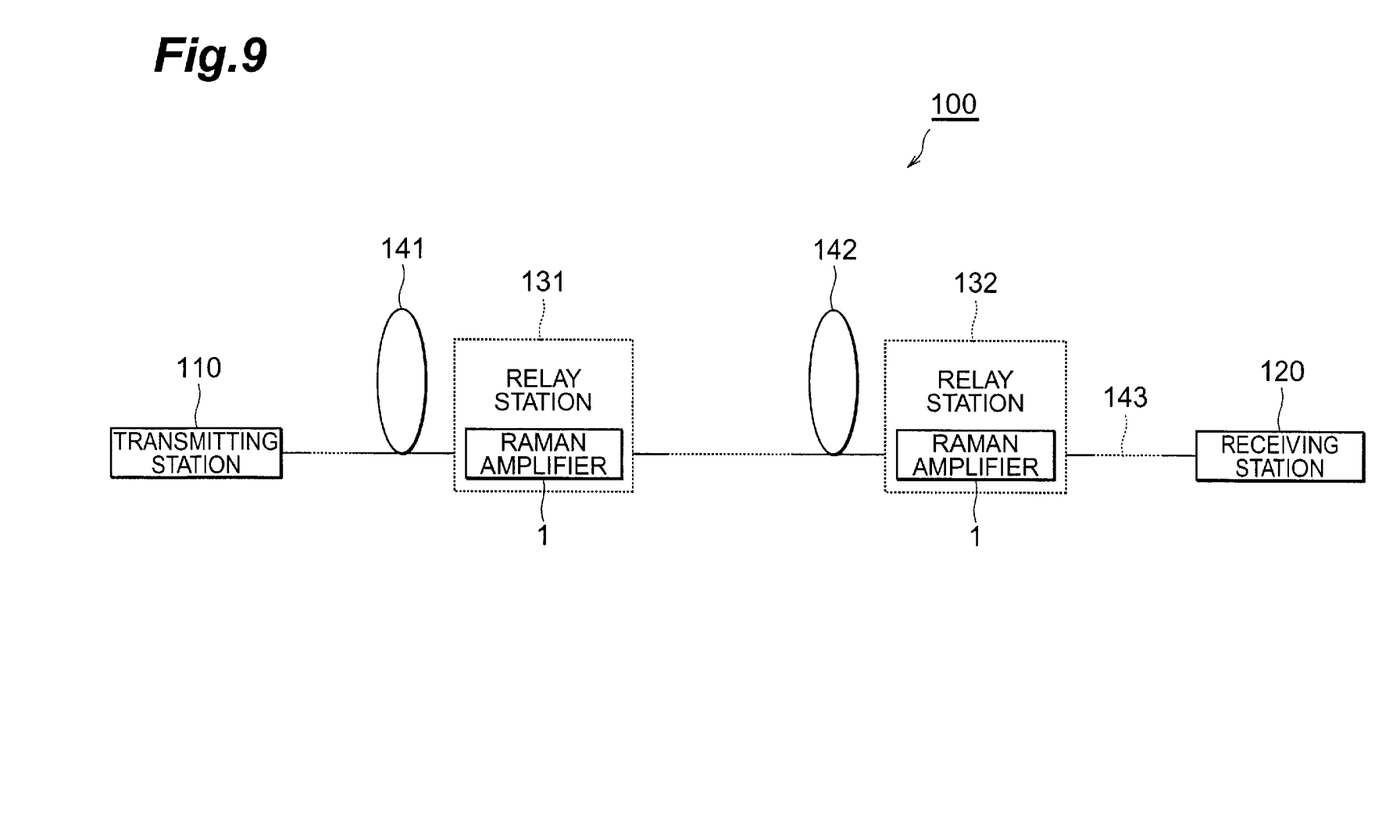
FIG. 9 is an illustration showing a configuration of an optical communication system according to the present invention.

FIG. 9 is an illustration showing a configuration of optical communication system 100 according to the present invention. This optical communication system 100 is of structure wherein relay stations (optical repeaters) 131, 132 are provided between a transmitting station 110 and a receiving station 120, an optical fiber transmission line 141 is installed between the transmitting station 110 and the relay station 131, an optical fiber transmission line 142 between the relay station 131 and the relay station 132, and an optical fiber transmission line 143 between the relay station 132 and the receiving station 120. The relay stations 131, 132 are provided with the Raman amplifier 1 of the structure as described above.

In this optical communication system 100, the signal light of multiple channels sent out of the transmitting station 110 propagates in the optical fiber transmission line 141 to reach the relay station 131. The signal light going into the relay station 131 is Raman-amplified by the Raman amplifier 1 in the relay station 131 and is fed into the optical fiber transmission line 142. Subsequently, the signal light outputted from the relay station 131 propagates in the optical fiber transmission line 142 to reach the relay station 132. The signal light going into the relay station 132 is Raman-amplified by the Raman amplifier 1 in the relay station 132 and is further fed into the optical fiber transmission line 143. Then the signal light outputted from the relay station 132 propagates in the optical fiber transmission line 143 to reach the receiving station 120. The signal light going into the receiving station 120 is demultiplexed into the signal lightwaves of the respective signal channels to be received at the receiving station 120. Since in this optical communication system 100 the signal light is Raman-amplified by the Raman amplifiers 1 of the structure as described above (the Raman amplifiers according to the present invention), if either one light source should suffer a breakdown out of the plurality of light sources included in the Raman amplifiers 1, the output power would be increased from another light source with the difference of the center wavelength of the output light being less than 6 nm from that of the output light from the broken light source, whereby the variation of the Raman amplification gain of the signal light in the Raman amplifiers 1 can be controlled to below 0.2 dB, so as to suppress the degradation of quality of the signal light effectively.

The system may also be configured in such structure that, instead of the Raman amplifiers 1 provided in the repeaters 131, 132, either of the Raman amplification pumping modules 10A to 10D of the configurations as described above is provided in each of the repeaters 131, 132 and the Raman amplification pumping light outputted from the Raman amplification pumping module 10 in each repeater 131, 132 is supplied into the optical fiber transmission line 141, 142. In this case, the optical fiber transmission lines 141, 142 are used as Raman amplification optical fibers.

It is noted that the present invention is by no means limited to the embodiments described above, but embraces a variety of changes and modifications. For example, the number of center wavelengths of the lightwaves multiplexed and outputted from the Raman amplification pumping module (the number of channels of the pumping light) can be greater than 6.

As described above, according to the present invention, the multiplexer multiplexes the lightwaves with the mutually different center wavelengths emitted from a plurality of light sources and supplies the multiplexed lightwaves as the pumping light into the optical waveguide. Then the signal light propagating in the optical waveguide is Raman-amplified in this optical waveguide. Particularly, in the present invention, the difference between center wavelengths of two lightwaves emitted from two light sources out of the plurality of light sources is set less than 6 nm (practically, 1 nm or more in the case without polarization multiplexing). Therefore, in the event that one light source suffers a breakdown out of the two light sources, the output power of the other light source is increased to control the variation of the Raman amplification gain of the signal light at a low level in the Raman amplification optical fiber and, as a result, the optical communication system can be realized so as to suppress the degradation of quality of signal light effectively.

Preferably, the pumping light generating system is configured so that the light sources output the 2N (N is an integer not less than 1) lightwaves with respective center wavelengths different from each other and the difference between the center wavelengths of the (2n-1)th and the (2n)th (n is an arbitrary integer not less than 1 nor more than N) out of the 2N lightwaves is less than 6 nm. In this case, if any one of the 2N light sources should suffer a breakdown, the output power would be increased from another light source with the difference of the center wavelength of the output light being less than 6 nm from that of the output light from the broken light source, whereby the variation of the Raman amplification gain of the signal light can be controlled at a low level in the Raman amplifier and whereby the degradation of quality of signal light can also be effectively suppressed in the optical communication system provided with the pumping light generating system (including the plurality of light sources).

The power of the Raman amplification pumping light can be increased by the configuration in which the pumping light generating system implements the polarization multiplexing of either lightwaves selected from a plurality of lightwaves and outputs multiplexed lightwaves. The stable Raman amplification operation can also be ensured by the configuration further comprising the depolarizer for depolarizing the polarization state of the pumping light or by the configuration in which the polarization multiplexer multiplexes the lightwaves in mutually orthogonal polarization states having the difference of less than 6 nm between the center wavelengths.

What is claimed is:

1. A Raman amplification pumping module which outputs pumping light for Raman amplification of signal light propagating in an optical waveguide, said Raman amplification pumping module comprising:

a pumping light generating system including a plurality of light sources for emitting respective lightwaves with center wavelengths different from each other; and a multiplexer for multiplexing the lightwaves with the mutually different center wavelengths emitted from the respective light sources to yield multiplexed lightwaves as said pumping light, wherein each of the center wavelengths of the lightwaves emitted from the respective light sources is adjusted so that a difference between two center wavelengths selected therefrom is less than 6 nm.

2. A Raman amplification pumping module according to claim 1, wherein each of the center wavelengths of the lightwaves emitted from the respective light sources is adjusted so that a difference between two center wavelengths selected therefrom is not less than 1 nm.

3. A Raman amplification pumping module according to claim 1, wherein said pumping light generating system is configured to output 2N (N is an integer not less than 1) lightwaves with center wavelengths different from each other, and wherein a difference between center wavelengths of the (2n−1)th and the (2n)th (n is an arbitrary integer not less than 1 nor more than N) lightwaves out of said 2N lightwaves is less than 6 nm.

4. A Raman amplification pumping module according to claim 1, wherein said pumping light generating system comprises a structure for effecting polarization multiplexing of lightwaves selected from said plurality of lightwaves.

5. A Raman amplification pumping module according to claim 1, further comprising:

a depolarizer for depolarizing a polarization state of the pumping light from said multiplexer.

6. A Raman amplification pumping module according to claim 1, further comprising:

a polarization multiplexer for multiplexing two lightwaves in mutually orthogonal polarization states having a difference of less than 6 nm between center wavelengths.

7. A Raman amplifier comprising:

an optical waveguide in which signal light propagates and which Raman-amplifies the signal light with supply of pumping light; and a Raman amplification pumping module according to claim 1 for supplying said pumping light into said optical waveguide.

8. An optical communication system comprising a Raman amplifier according to claim 7.

9. A Raman amplification pumping module which outputs pumping light for Raman amplification of signal light propagating in an optical waveguide, said Raman amplification pumping module comprising:

a pumping light generating system including a plurality of light sources for emitting respective lightwaves with center wavelengths different from each other, wherein said plurality of light sources constitute one or more light source pairs of light sources emitting lightwaves with center wavelengths adjacent to each other; and a multiplexer for multiplexing the lightwaves with the mutually different center wavelengths emitted from the respective light sources to yield multiplexed lightwaves as said pumping light, wherein in each of said light source pairs, a wavelength spacing between a center wavelength of light emitted from one light source and a center wavelength of light emitted from the other light source is set less than 6 nm.

10. A Raman amplification pumping module according to claim 9, wherein in each of said light source pairs, a wavelength spacing between a center wavelength of light emitted from one light source and a center wavelength of light emitted from the other light source is set not less than 1 nm.

11. A Raman amplification pumping module according to claim 9, wherein, concerning light sources emitting respective lightwaves with center wavelengths adjacent to each other and included in respective light source pairs different from each other, out of said plurality of light sources, a wavelength spacing between a center wavelength of light emitted from one light source and a center wavelength of light emitted from the other light source is not less than 6 nm.

12. A Raman amplification pumping module according to claim 9, wherein said pumping light generating system comprises a structure for effecting polarization multiplexing of lightwaves selected from said plurality of lightwaves.

13. A Raman amplification pumping module according to claim 9, further comprising:

a depolarizer for depolarizing a polarization state of the pumping light from said multiplexer.

14. A Raman amplification pumping module according to claim 9, further comprising:

a polarization multiplexer for multiplexing two lightwaves in mutually orthogonal polarization states having a difference of less than 6 nm between center wavelengths.

15. A Raman amplifier comprising:

an optical waveguide in which signal light propagates and which Raman-amplifies the signal light with supply of pumping light; and a Raman amplification pumping module according to claim 9 for supplying said pumping light into said optical waveguide.

16. An optical communication system comprising a Raman amplifier according to claim 15.

* * * * *